United States Patent [19]

Slanker

[11] Patent Number: 4,966,506
[45] Date of Patent: Oct. 30, 1990

[54] WELDING TIP DRESSER

[75] Inventor: Daniel W. Slanker, Huber Heights, Ohio

[73] Assignee: Stillwater Technologies, Inc., Troy, Ohio

[21] Appl. No.: 487,843

[22] Filed: Mar. 5, 1990

[51] Int. Cl.⁵ .............................................. B23C 3/12
[52] U.S. Cl. .................................... 409/140; 219/119; 407/33; 409/181
[58] Field of Search ............... 409/181, 180, 138, 140, 409/139, 182, 175; 219/119; 407/33, 40, 30, 31, 51, 55, 56, 65

[56] References Cited

U.S. PATENT DOCUMENTS

| | | | |
|---|---|---|---|
| 2,286,931 | 6/1942 | Radeke | 409/140 X |
| 2,930,289 | 3/1960 | Swarts | 409/181 |
| 3,820,437 | 6/1974 | Dyer et al. | 409/140 |
| 4,578,005 | 3/1986 | Fuse et al. | 409/140 |
| 4,815,901 | 3/1989 | Restout | 409/181 |
| 4,856,949 | 8/1989 | Shimada | 409/140 |
| 4,921,377 | 5/1990 | Hoch et al. | 409/140 |

FOREIGN PATENT DOCUMENTS

| | | | |
|---|---|---|---|
| 1224775 | 6/1960 | France | 219/119 |
| 138072 | 5/1989 | Japan | 219/119 |
| 610911 | 10/1948 | United Kingdom | 219/119 |
| 1189104 | 4/1970 | United Kingdom | 219/119 |

OTHER PUBLICATIONS

Portable Electrode Dressers Brochure of ARO Corp., copyright 3-81.

*Primary Examiner*—William Briggs
*Attorney, Agent, or Firm*—William Weigl

[57] ABSTRACT

Dressing device for the welding tips of a spot-welding machine consists of a single tool carried crosswise of a cylindrical opening in a tool holder. The tool holder has opposed slots supporting the tool, with one edge of the slots and therefore one side of the tool at the crosswise centerline of the opening. A cutting edge on that side of the tool and adjacent the tip dresses the tip to provide an essentially flat welding face. The holder and tool are rotated about the tip while the tip is held on an arm of a spot-welding machine. Preferably, when the dressing device is used in a high production situation, the tool is symmetrical and has a pair of outwardly-directed cutting edges on the centerline, simultaneously dresing two tips as they approach the tool from opposite directions.

6 Claims, 1 Drawing Sheet

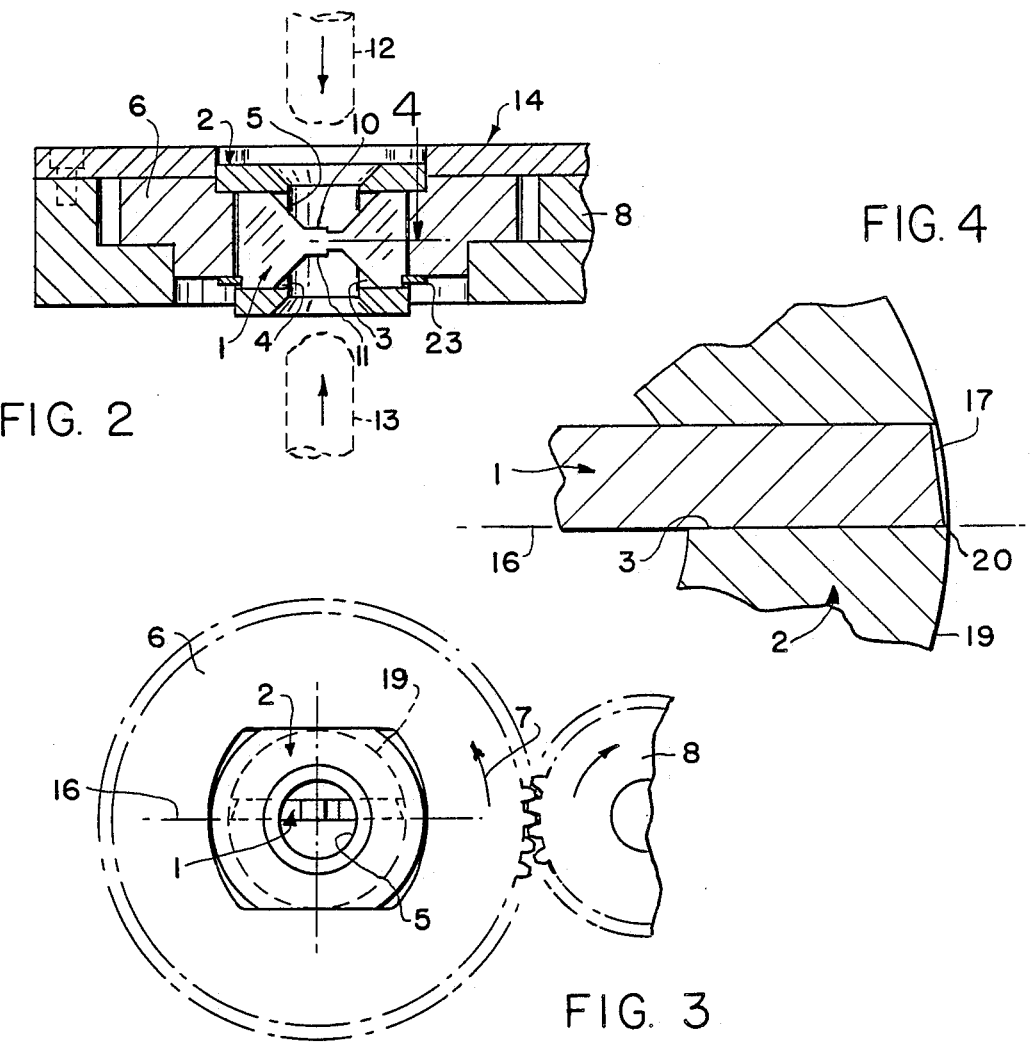
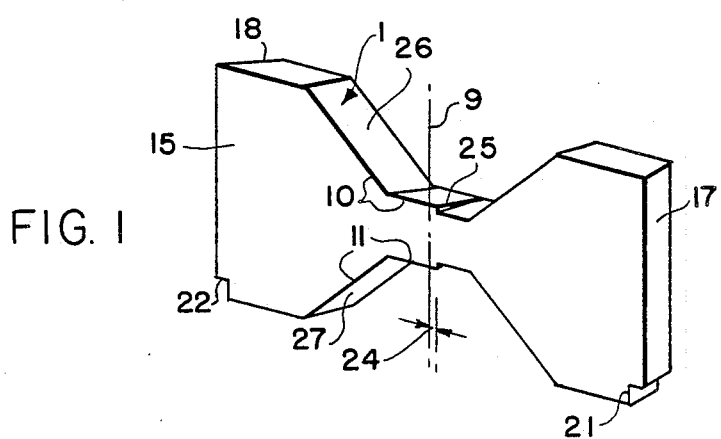

WELDING TIP DRESSER

This invention relates to an effective and economical tool for dressing welding tips of a spot-welding machine, particularly one intended for use in a high-production environment such as in the manufacture of automobiles, home appliances and other products having a high sheet metal content.

BACKGROUND OF THE INVENTION

Spot welding tips are conventionally made of a highly-conductive, readily-machinable material such as copper. To be most effective, the area of the metal-contacting faces of the opposed tips should be maintained flat and relatively uniform in cross section. To obtain this face uniformity, the tips are frequently given a frusto-conical shape, with the frustum of the cone becoming the flat face of the welding tip. Tip wear is frequent, due to mushrooming, pitting or accumulation of oxides from the material being welded.

Robotically-controlled welders for components and structural members of modern-day motor vehicles can require dressing of the tips every 15 or 20 production units. In critical applications where weld failure could have serious consequences, even more frequent dressing may be required. Clearly, unless the dressing operation is performed automatically, rapidly and under controlled conditions, production can be seriously hampered and tip life adversely affected. To solve this problem, stationary tool dressing machines are provided alongside such robots, and at preselected intervals, the robots move their tips to the dressing machines and simultaneously direct both opposing tips into the machines. Then, after a very brief dressing period, they return to their production stations.

Dressing tools in present-day use are typically complex and costly, frequently having several cutting edges spaced circumferentially around a tip. Because of their small size, such tools are difficult and expensive to manufacture. Further, unless they properly dress the tips, an increased incidence of weld failure can occur, and significantly reduced tip life can result.

SUMMARY OF THE INVENTION

This invention pertains to a cutting tool for a welding tip dressing machine, particularly to a low-cost, effective single tool with but one cutting edge acting on a given tip. The tool is elongated and is mounted in opposed slots in a tool holder to bridge or span a cylindrical opening in the holder. The opening is adapted to align welding tips with the tool as the tips are dressed. In its preferred form when used for high rate production, the single tool is provided with symmetrical cutting edges along one side to enable dressing of a pair of tips approaching the tool from opposite directions. Either the tool or holder or both are provided with means to assure the tool's proper installation in the holder.

IN THE DRAWINGS

FIG. 1 is a perspective view of the preferred form of elongated cutting tool according to the invention.

FIG. 2 is a cross-sectional view of the tool of FIG. 1 mounted in a holder, which is in turn mounted in a driver for unidirectionally rotating the tool and holder to dress a pair of welding tips simultaneously.

FIG. 3 is a plan view of the assembly of FIG. 2, taken looking from above.

FIG. 4 is an enlarged cross-sectional view taken looking in the direction of arrow 4 in FIG. 2.

PREFERRED EMBODIMENT OF THE INVENTION

An elongated cutting tool 1 is adapted to be mounted in a cylindrical holder in the form of a sleeve 2, its ends being supported therein by slots 3 and 4. As can be seen in FIGS. 2 and 3, the tool 1 bridges a cylindrical opening 5 in sleeve 2. The holder 2 is in turn mounted in a driven member 6, which is illustrated as a gear. Gear 6 is driven at a speed which may range between 300 to 700 RPM in the direction of arrow 7 in FIG. 3. It is driven by means of a driving gear 8. In the illustration shown, the tool 1 rotates counter-clockwise around axis 9 (FIG. 1). In so doing, cutting edges 10 and 11 dress welding tips 12 and 13 respectively, as the tips are inserted into the opening 5. The tips are shown in dotted lines in FIG. 2, it being understood that they are part of a conventional spot-welder. While I am illustrating my invention in connection with an automated welding system, it should be clear that the concept is equally applicable to a manual dressing operation in which the tips are stationary and the tool is moved to the tips in sequence or the tool is held in position and the arms of the welder are brought together toward the tool.

The elements thus far described are all carried in a driver 14 which may be driven by air, electrical power or other motive means. The driver is illustrated for purposes of explanation only and forms no part of the improvement. Its construction has been simplified and it can be readily understood from the drawings without further explanation The tool 1 is loosely carried in the holder 2 and is capable of several thousandths of an inch lengthwise float to assist in the tool self-centering itself to a tip or tips being dressed. Also, because the tool 1 is free to float lengthwise within limits in the holder 2, and further because the holder is driven in one direction only, it is essential that means be provided to assure that the tool be installable in only the correct manner. Obviously, if leading side 15 (FIG. 1) trails due to incorrect installation, the cutting edges 10 and 11 cannot cut into the copper tips and dressing will not occur. As shown in FIGS. 3 and 4, tool 1 has its leading side 15 (and thus its cutting edges 10 and 11) located directly on a crosswise centerline 16. One side of each slot 3 and 4 is necessarily also on that same centerline. This means that ends 17 and 18 of tool 2 are preferably angled as shown in FIG. 4 to accommodate the curvature of outer surface 19 of sleeve holder 2. The angles are exaggerated in FIG. 3 for purposes of illustration. The amount of relief between the surface 19 and the ends 17 and 18 is but a few thousandths of an inch. The desirability of the angling is so that the points 20 at the ends of the tool would protrude beyond surface 19 if the tool is installed backwards. This provision assures that the leading side 15 will be forward. However, this alone is not enough to protect against improper installation. It would still be possible to present side 15 forward but have the tool upside down if that were the only provision to guard against improper placement of the tool in the holder 2. A second means is provided in the form of notches 21 and 22 at the bottom of tool 1. Those notches are made to coincide with the inner edge of a snap-ring 23 which retains the holder 2 in the gear 6 as can be seen in FIG. 2. While I have shown two separate means for assuring proper installation of the tool 1 in holder 2, various other interlocking techniques, including but a single such interlock, are feasible. Since the preferred form of my invention is designed to be used in a high-production environment, some guarantee is desired to avoid any lost time such as would occur if interlocking means were not provided.

For best cutting results, the cutting edges 10 and 11 are either right on centerline 16 or just behind it. Chips or curls of copper removed from the welding tips fall by gravity. Relief for dropping of the chips from upper tip 12 is enabled by that half of the opening 5 between side 15 of tool 1 and the inner surface of holder 2. Because of the float capability of the tool 1, the portions of the cutting edges 10 and 11 that dress the faces of the tips extend across the centerline 9 by about 0.015 to 0.025 inches as shown at 24 in FIG. 1. Also, a rake 25 is desired at the cutting edges for best results. This is achieved by machining the top and bottom edges 26 and 27 which face toward the tool so that the cutting edges are at a sharp acute angle.

Let us now assume that a tool has worn and is to be replaced. Snap-ring 23 is first removed in conventional fashion, allowing the holder to be lifted from driver 14. Tool 1 can then be slid sideways from the slots 3 and 4. A replacement tool is then slid into the slots, making sure that that points 20 do not protrude beyond the surface 19. An experienced operator would know to also have notches 21 and 22 facing downwardly, but if he forgot or didn't know to do that in the first instance, he would soon become aware of a problem when he tried to place the snap-ring in position. A groove is provided in the holder to receive the snap-ring. If the tool were put in place upside down, the snap-ring 23 would be prevented from entering its groove because of interference from the upper unnotched corners of the tool. Once the tool 1 is properly installed, the holder can be replaced in the gear 6 and the snap-ring inserted in the groove. The system is then ready for dressing as before.

Various changes may be made without departing from the spirit and scope of my invention. For example, the driven member 6 and tool holder 2, while being shown as separate elements, can actually be a single element performing both functions. And, while I have described my invention in connection with robotic welders, the tool and holder may be mounted in a hand-held power tool and manually moved to a pair of welding tips one at a time or have both tips inserted into the power tool by the welding machine while the power tool is held in position between the tips. When used in a hand-held unit, only one cutting edge may be provided and the power tool inverted whenever moving from one tip to the other.

Having described my invention, I claim:

1. In a dresser for shaping the product-contacting tip of a worn, elongated cylindrical electrode while it is mounted on an arm of a spot-welding machine to essentially restore a welding face of the tip to its physical condition prior to use and wear; said dresser comprising an elongated cutting tool, a holder for receiving and supporting said tool, and a motive means for unidirectionally rotating said holder and tool about a point on said face during dressing, said holder including a central cylindrical opening for receiving a welding tip to be dressed and a pair of opposed slots across said opening for receiving the ends of said elongated tool in bridging fashion, the improvement comprising:

said tool having opposed sides one of which lies in a plane extending in the direction of receipt of an electrode and being located essentially on a crosswise centerline of said cylindrical opening, said tool further having an edge essentially facing an electrode to be dressed, said edge and said one side being at an acute angle to form a sharp, raked cutting edge, said cutting edge further extending from the inner surface of said opening to a point beyond the axis of said opening whereby rotation of the leading cutting edge of said tool into the tip dresses the tip of said electrode and restores its welding face to its original condition.

2. The invention according to claim 1 wherein the tip to be dressed is essentially frusto-conical in shape and wherein said cutting edge extends radially from the axis of the opening for a first portion of its length to provide the welding face on said tip and extends a second portion from said first portion to the inner surface of said opening to provide a tapering surface between the welding face and the cylindrical portion of the electrode.

3. The invention according to claim 1 wherein said central opening extends fully through said holder to enable receipt of a pair of electrode tips in unison from opposite sides of said holder, and wherein said one side of said cutting tool has a second raked cutting edge for simultaneously dressing both said electrodes while said tool holder is unidirectionally driven by said motive means.

4. The invention according to claim 1 wherein means is provided on said tool and holder to assure that they are assembled with that one side of the tool containing the cutting edge being at the crosswise centerline of said central opening with the cutting edge forward.

5. The invention according to claim 4 wherein said holder has coaxial inner and outer cylindrical surfaces defining a wall therebetween, wherein said slots extend through said wall, and wherein the ends of said elongated tool extend to near, but just short of, the outer surface of said holder and are shaped at their ends so as to protrude beyond the cylindrical outer surface in the event of backward installation, said tool being capable of a slight amount of lengthwise floating to enable self-centering of the tool to a tip being dressed.

6. The invention according to claim 5 wherein said holder is provided with a groove for receiving a retaining ring, and wherein said tool is provided with notches at its ends into which said ring fit when the tool is properly installed, installation of the ring being inhibited if the notches of the tool are not in alignment with the groove.

* * * * *